3,089,895
METHOD OF PRODUCING TETRAALKOXY-DIBORONS

Herbert C. Newsom, Whittier, and Robert J. Brotherton, Fullerton, Calif., assignors to United States Borax & Chemical Corporation, Los Angeles, Calif., a corporation of Nevada
No Drawing. Filed July 23, 1962, Ser. No. 211,901
7 Claims. (Cl. 260—462)

This invention relates to a novel method of producing tetraalkoxydiborons and, more particularly, this invention relates to a method of producing a tetraalkoxydiboron from a different tetraalkoxydiboron.

It is, therefore, the principal object of this invention to provide a facile method for producing tetraalkoxydiboron compounds. Other objects will become apparent from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the method of producing a tetraalkoxydiboron having the formula

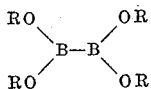

which comprises reacting a compound of the formula

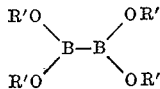

with a stoichiometric excess of an alkanol of the formula ROH, where R is selected from the group consisting of the primary and secondary alkyl radicals having at least two carbon atoms and R' is an alkyl group which is derivable from an alkanol of the formula R'OH normally having a boiling point lower than said ROH.

The reaction can be illustrated by the equation

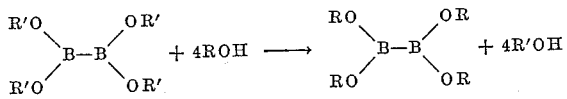

where R and R' have the significance previously assigned.

As set forth in the above equation, at least four moles of ROH are required for reaction with each mole of diboron compound. However, for best conversions to the desired product a stoichiometric excess, that is, more than four moles of ROH, are used for each mole of diboron reactant present. Thus, one tetraalkoxydiboron, such as tetramethoxydiboron, can be used to prepare easily a large series of higher tetraalkoxydiborons in good yield. This is surprising in view of the reported instability of boron-boron bonds to excess alkanols.

The diboron reactant can be any tetraalkoxydiboron in which the alkoxy portion is derivable from an alkanol which normally has a boiling point lower than the alkanol reactant. The tetraalkoxydiboron reactants can be prepared by the reaction of a stoichiometric amount of alcohol, such as methanol, and HCl with tetra(dimethylamino)diboron, as described by Brotherton et al., J. Amer. Chem. Soc. 82, 6245 (1960). Lower alkoxydiborons, such as those having one to about six carbon atoms in the alkoxy moiety, are preferred. Examples of such reactants include:

Tetramethoxydiboron
Tetraethoxydiboron
Tetraisopropoxydiboron
Tetraisobutoxydiboron
Tetra-n-hexyloxydiboron Tetramethoxydiboron is the presently preferred diboron reactant.

As for the alkanol reactant, it can be any primary or secondary alkanol having at least two carbon atoms. Preferably, it is a lower alkanol, having two to about eight carbon atoms, although the higher alkanols can also be used. Examples of suitable alkanol reactants include:

Ethanol
n-Propanol
Isopropanol
n-Butanol
Isobutanol
n-Pentanol
2-Hexanol
n-Octanol
n-Dodecanol Of course, the selection of the particular reactants will depend on the product desired as well as the respective boiling points of the alkanol reactant and the alkanol derivable from the alkoxy moiety of the diboron reactant.

The reaction takes place at a temperature in the range of from about room temperature (25° C.) to a maximum temperature dictated by the decomposition temperature of the diboron compounds. Preferably, a reaction temperature in the range of about 50° to about 75° C. is employed. An inert solvent, such as the common hydrocarbon solvents, can be used to control the reaction temperature, or a large excess of the alkanol reactant can be used as the reaction medium.

The reaction time is not particularly critical, being somewhat dependent on the reaction temperature as well as the particular reactants employed. Generally, a reaction period of about one to five hours will give a good yield of the desired product, although greater or lesser time periods can also be used with success.

As pointed out hereinbefore, a stoichiometric excess of the alkanol reactant is used; that is, more than four moles of alkanol reactant are used for each mole of diboron reactant. Preferably, an alkanol:diboron molar ratio of at least 5:1 is used.

The by-product alkanol can be removed as it is formed, as, for example, by azeotropic distillation, or it can all be removed after the reaction has been completed. The desired product is isolated and purified by conventional means such as distillation under reduced pressure.

The following examples are intended for purposes of illustration and are not meant to limit the scope of this invention as modifications will be obvious to those skilled in the art.

Example 1

Tetramethoxydiboron (4.0 g.; 0.0275 mole) was dissolved in 25 ml. of petroleum ether (B.P. 60–65° C.). Isopropanol (7.2 g.; 0.120 mole) was added and the solution refluxed for 65 hours. The solvent and volatile materials were then removed by distillation at 30° C. (0.3 mm.), leaving 3.02 g. (42.7% yield) of residual tetraisopropoxydiboron, $n_D^{26}$ 1.3971.

Calculated for $C_{12}H_{28}B_2O_4$: B=8.39%. Found in product: B=8.41%.

Example 2

Tetramethoxydiboron (4.0 g.; 0.0275 mole) was dissolved in 10.12 grams (0.22 mole) of ethanol and the solution then distilled through a 3-inch Vigreux column, gradually reducing the pressure so that the last distillate was removed at 30° C. (2 mm.). The total distillation time was one hour; the pot temperature varied from 35° to 45° C. Tetraethoxydiboron (3.5 g.; 63% yield) was collected as the residue in the distillation flask, $n_D^{26}$ 1.3953.

Calculated for $C_8H_{20}B_2O_4$: B=10.74%. Found in product: B=10.83%.

*Example 3*

Tetramethoxydiboron (0.7987 g.; 5.49 mmoles) was condensed into a trap in a high vacuum system, and ethanol (9.97 g.; 219.6 mmoles) condensed into the same trap at −196° C. The trap was isolated from the system, warmed to 55–60° C. for 1 hour, then again cooled to −196° C. No observable pressure of noncondensable gas was registered on the manometer, indicating that no B—B cleavage had occurred with consequent hydrogen formation. The temperature of the liquid was then raised to 0° C. and the vapors passed through traps at −22°, −78°, and −196° C.

The residual liquid (0.5695 g.) showed no observable vapor pressure at 25° C. (pressure of tetramethoxydiboron at 25° is 7.2 mm.). Its infrared spectrum matched tetraethoxydiboron; $n_D^{25}$ 1.3950.

Other modes of applying the principle of the invention may be employed, change being made as regards the details described, provided the features stated in any of the following claims or the equivalent of such be employed.

We, therefore, particularly point out and distinctly claim as our invention:

1. The method of producing a tetraalkoxydiboron having the formula

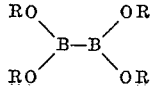

which comprises reacting a compound of the formula

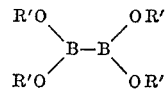

with a stoichiometric excess of an alkanol of the formula ROH where R is selected from the group consisting of the primary and secondary alkyl radicals having at least two carbon atoms and R′ is an alkyl group which is derivable from an alkanol of the formula R′OH, normally having a boiling point lower than said ROH.

2. The method of claim 1 in which said reaction takes place at an elevated temperature.

3. The method of claim 1 in which R′ is a lower alkyl group having one to about six carbon atoms.

4. The method of producing a tetraalkoxydiboron having the formula

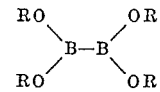

which comprises reacting at an elevated temperature tetramethoxydiboron with an alkanol of the formula ROH in an alkanol: diboron molar ratio of at least 5:1, where R is selected from the group consisting of the primary and secondary alkyl radicals having at least two carbon atoms.

5. The method of claim 4 in which said alkanol is ethanol.

6. The method of claim 4 in which said alkanol is isopropanol.

7. The method of claim 4 in which said elevated temperature is in the range of 50° to 75° C.

No references cited.